US012252424B2

(12) United States Patent
Capeau et al.

(10) Patent No.: US 12,252,424 B2
(45) Date of Patent: Mar. 18, 2025

(54) METHOD AND DEVICE FOR ANAEROBIC DIGESTION

(71) Applicant: Orege, Voisins-le-Bretonneux (FR)

(72) Inventors: Patrice Capeau, Saragossa (ES); Pascal Gendrot, Mere (FR)

(73) Assignee: Orege, Voisins-le-Bretonneux (FR)

( * ) Notice: Subject to any disclaimer, the term of this patent is extended or adjusted under 35 U.S.C. 154(b) by 530 days.

(21) Appl. No.: 17/417,843

(22) PCT Filed: Dec. 24, 2019

(86) PCT No.: PCT/EP2019/087033
§ 371 (c)(1),
(2) Date: Jun. 24, 2021

(87) PCT Pub. No.: WO2020/136213
PCT Pub. Date: Jul. 2, 2020

(65) Prior Publication Data
US 2022/0212969 A1  Jul. 7, 2022

(30) Foreign Application Priority Data
Dec. 26, 2018 (FR) ...................... 1874158

(51) Int. Cl.
C02F 9/00 (2023.01)
B01F 23/2326 (2022.01)
(Continued)

(52) U.S. Cl.
CPC ............ *C02F 9/00* (2013.01); *B01F 23/2326* (2022.01); *B01F 25/31242* (2022.01);
(Continued)

(58) Field of Classification Search
CPC .......... C02F 1/20; C02F 11/04; C02F 11/121; C02F 9/00; C02F 11/123; C02F 1/56; C02F 1/24; B01F 23/2326; B01F 23/214
(Continued)

(56) References Cited

U.S. PATENT DOCUMENTS

| | | | |
|---|---|---|---|
| 2014/0352529 A1 | 12/2014 | Arbuthnot et al. | |
| 2017/0029291 A1* | 2/2017 | Capeau | ............... B01D 21/0084 |
| 2018/0155228 A1* | 6/2018 | Capeau | ..................... C02F 1/24 |

FOREIGN PATENT DOCUMENTS

| | | |
|---|---|---|
| CN | 105836834 A | 8/2016 |
| WO | 9005583 A1 | 5/1990 |

(Continued)

OTHER PUBLICATIONS

Capeau et al, English machine translation WO2015079175, pp. 1-17 (Year: 2015).*

(Continued)

*Primary Examiner* — Claire A Norris
(74) *Attorney, Agent, or Firm* — Banner & Witcoff, Ltd.

(57) ABSTRACT

The invention relates to a method and a device for anaerobic digestion from an organic liquid sludge (21), comprising, in a known manner, a step of hydrolysis/acidogenesis of the sludge in a digester (47, 100), a step of acetogenesis for producing acetate from the hydrolysed sludge and a step of methanogenesis from the acetates for producing methane. The method comprises an initial step of creating a hydrolysed sludge emulsion (23) obtained by means of the impact of the sludge with gas (27) injected into the sludge, then continuously supplying the hydrolysed sludge to a reactor (25, 101) pressurised in line relative to the digester, before discharging said sludge from the reactor via a member (29)

(Continued)

generating a pressure drop in the hydrolysed sludge, the initial stage being repeated at least once before supplying the, and/or via the, digester.

18 Claims, 10 Drawing Sheets

(51) Int. Cl.
    *B01F 25/312* (2022.01)
    *B01F 101/00* (2022.01)
    *C02F 1/20* (2023.01)
    *C02F 1/24* (2023.01)
    *C02F 1/56* (2023.01)
    *C02F 11/04* (2006.01)
    *C02F 11/123* (2019.01)

(52) U.S. Cl.
    CPC . *B01F 2101/305* (2022.01); *B01F 2215/0422* (2013.01); *B01F 2215/045* (2013.01); *C02F 1/20* (2013.01); *C02F 1/24* (2013.01); *C02F 1/56* (2013.01); *C02F 11/04* (2013.01); *C02F 11/123* (2013.01); *C02F 2301/046* (2013.01); *C02F 2301/066* (2013.01); *C02F 2303/06* (2013.01)

(58) Field of Classification Search
    USPC .......................................... 210/613, 631, 605
    See application file for complete search history.

(56) References Cited

FOREIGN PATENT DOCUMENTS

WO    WO-2015079175 A1 * 6/2015 ......... B01D 21/0084
WO    WO-2016193600 A1 * 12/2016 .......... B01F 13/0227

OTHER PUBLICATIONS

Feb. 4, 2020, International Search Report of PCT/EP2019/087033.
Mar. 27, 2024 Office Action in U.S. Appl. No. 17/418,196.
Claims of U.S. Appl. No. 17/418,196 as of Mar. 27, 2024.
Claims, International Search Report and Written Opinion of the International Searching Authority from PCT/EP2019/087032.

* cited by examiner

METHOD AND DEVICE FOR ANAEROBIC DIGESTION

The present invention relates to an improved methanization process carried out using an organic liquid sludge.

An organic sludge is understood to mean a sludge comprising at least 10% of organic matter.

The invention also relates to a methanization device that implements such a process and to the intermediate product obtained before the actual decomposition/digestion process that makes it possible to obtain biogas.

The invention finds a particularly significant, although not exclusive, application in the field of renewable energy and more particularly of obtaining biogas suitable for being converted into heat, into electricity and/or into fuel for vehicles.

It is known that the methanization phenomenon occurs naturally in marshes, site of decomposition of plant and animal matter.

But it is also possible to obtain it from liquid waste and in particular from organic sewage sludge comprising bacterial substances and their secretions.

The methanization of sludge is a complex biological process.

Conventionally, the organic sludge must be stored in a hermetic tank known as a digester in which it is subjected for a given time to the action of anaerobic bacteria.

In the absence of oxygen, the biological reaction steps involved are the following:

(i) a step of hydrolysis and of acidogenesis during which the complex organic chains (proteins, lipids, polysaccharides, etc.) are converted to simpler compounds.

This decomposition is generally the limiting step owing to the presence of compounds that are difficult to hydrolyze such as cellulose, starch or fats.

At the end of the reaction, the acidogenesis produces organic acids (fatty acids, amino acids, etc.) and also hydrogen and carbon dioxide.

(ii) a step of acetogenesis in which the products obtained previously are converted into products that are direct precursors of methane, essentially formed of acetate, acetic acid, carbon dioxide and hydrogen.

In order to do this and in a manner known per se, two types of bacteria are notably used, namely obligate hydrogen-producing acetogens (OHPAs) and non-syntrophic acetogenic bacteria oriented toward the production of acetate.

This step requires the continuous removal of the hydrogen produced.

(iii) the final step of methanogenesis during which acetic acid is converted into methane and into carbon dioxide.

As is known, methanogenesis is carried out by Archaea-type anaerobic microorganisms and comes under two types of reaction:

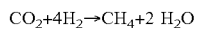

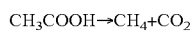

knowing that the methanogenic Archaea develop when, in the presence of trace elements, the potential, redox, temperature and pressure conditions are satisfactorily met.

The methane obtained is recovered in the top part of the digester.

The residual matter (digestate) is itself recovered and stored.

As indicated above, the main factor limiting the methanization lies during the hydrolysis of the sludge, owing to the difficulty in correctly and rapidly hydrolyzing the fats, starch and other celluloses initially present in the sludge.

The present invention aims to provide a process, a system and an intermediate product which are better at satisfying the practical requirements than those previously known, in particular in that it makes it possible to improve the first hydrolysis step of the known methanization processes, this being so while enabling, at the end of the process, an improvement in the yield for the production of methane produced and the obtaining of a digestate that is more usable since it is more mineral. Owing to the invention, it is possible to reduce the size of the digesters and/or to increase the residence time in the existing digesters when they are in overload, or else to make it possible to introduce an additional organic feedstock when they are not in overload, which increases the yield accordingly.

It thus enables an additional recycling of wastewater treatment plant sludge in a context of environmentally-friendly green economy.

Anaerobic digestion thus becomes an optional additional step for treating sludge, enabling the stabilization thereof and a reduction in the volume thereof, while also facilitating the dewatering thereof.

It is known that the total solids (TS) of a sludge is formed of organic matter, mineral matter and dissolved salts. This total solids comprises a portion of volatile solids (VS) which will represent, on average, 70% to 80% of an organic sludge before treatment moving to the order of 50% for a digested sludge.

To evaluate the performance of this digestion, use is conventionally made of the comparison of the concentrations of volatile solids between the inlet and the outlet of the digester.

This yield of the digester depends on several parameters, including the physical nature of the sludge, the actual residence time, the effectiveness of the mixing in the digester, the temperature maintenance, the pH and the biodegradability of the sludge.

It is observed that it is the most biodegradable portion of the sludge which is destroyed first by the digestion.

The invention therefore starts from the idea that by increasing this biodegradable portion before the digestion, the whole of the process will thereby be improved, all other parameters being equal.

Sludge disintegration processes are already known that are used as a pretreatment before an anaerobic digestion.

The objective of these techniques is to dissolve the particulate organic matter and reduce the size of the bacterial flocs.

However, these mechanical or chemical techniques have drawbacks.

In particular they give an insufficient performance owing to oxidation reactions that give rise to the appearance of non-biodegradable resistant organic substances which lead to the opposite effect to the one desired.

For example, preparation techniques via the action of ultrasounds on the sludge are known. These will however give rise to cavitation phenomena on the molecular level, and therefore to very high pressures/temperatures which are a cause of oxidation by production of free radicals.

There are also thermal hydrolysis techniques. Although these are more powerful and make it possible to obtain a significant improvement in the performance of a digester, they are however expensive in terms of equipment and operating costs, and/or require heating to high temperatures (160° C. to 180° C.)

In summary, all these techniques are expensive and have the drawback of producing organic substances that are resistant to the digestion process partly canceling out the effect of the digestion by the anaerobic bacteria, these substances being found at the outlet of the plant in the form of a non-biodegradable discharge.

Lastly, the effectiveness of the sludge preparation processes is linked to the initial TS loading of these sludges.

Thus, in the case of mechanical lysis techniques with local or chemical action such as those mentioned above and using ultrasounds or chemical oxidation, the maximum recommended loading is from 6 to 8 g per liter of TS, which inevitably leads to a design of a pre-digestion preparation plant of large size.

Regarding thermal hydrolysis techniques, for which the initial concentration for an optimized treatment is of the order of 20 g per liter, all lower concentrations on the other hand generate additional costs, which here too poses problems of space, homogenization and price.

The present invention aims to overcome these drawbacks by improving in particular the yield of known digesters in a simple, compact and inexpensive manner, by introducing a complementary treatment upstream, which surprisingly and simultaneously makes it possible to thicken the sludge to be digested, to lower its viscosity and to increase the dispersion of organic matter in the mass of water, everything being combined with a partial lysis of the bacteria.

Such a result is obtained in an economic manner by the addition of a small supplementary device that makes it possible to obtain a more compact overall methanization system or to maintain a longer residence time for digesters that have become excessively loaded.

For this purpose, the present invention proposes in particular a methanization process starting from an organic liquid sludge comprising, in a known manner, in a digester, a step of hydrolysis/acidogenesis of the sludge, a step of acetogenesis for production of acetate from the hydrolyzed sludge and a step of methanogenesis starting from the acetates in order to produce methane, characterized in that it comprises an initial step of creating a hydrolyzed sludge emulsion, obtained by blasting the sludge with gas injected into said sludge, then continuously supplying said hydrolyzed sludge to a pressurized reactor that is in-line with respect to the digester, before evacuating the reactor via a member that generates a pressure drop in said hydrolyzed sludge, said initial step being repeated at least once before supplying the digester and/or after passing through the digester and before resupplying the latter.

This repeated supplementary initial step specifically enables, starting from a viscous incompressible fluid constituted by the organic sludge to be treated, the production of a compressible fluid comprising bacteria and flocs of bacteria owing to relatively soft pressure/backpressure cycles, for which it is observed that they sufficiently destroy (lyse) a portion of the bacteria present in the sludge unexpectedly when the number N of these cycles exceeds a certain threshold at least equal to 2.

Advantageously, such a treatment is carried out without any addition of flocculant which will appear detrimental to those skilled in the art seeking on the contrary to promote a composition that enables a better initial hydrolysis in the methanizer, which must allow flocculation. In practice, excellent results are however obtained.

But in another embodiment, where a flocculation of the sludge is actually carried out after the initial step before repeating at least once, a person skilled in the art could, on the other hand, here expect a destruction of the floc obtained.

Yet, although it is observed that the present invention indeed breaks this flocculation, this in fact, and ultimately relatively gently, disperses the organic matter while thus allowing a greater provision of this organic matter to the following process of digestion by bacteria for example of Archaea type.

Advantageously, the gas used is air.

Here it might have been thought that an injection of air into the bacterial medium would be prejudicial to the methanization treatment having to be carried out downstream by anaerobic bacteria. The result observed is in fact different.

But in other applications the gas used is $CO_2$, nitrogen ($N_2$) or biogas (obtained for example in the digester downstream and partly recycled), or a combination thereof optionally with air.

Advantageously, the cycle of the initial step is carried out, on the hydrolyzed emulsion obtained, successively at least N times with $N \geq 4$, $N \geq 7$ or 8 or else $N \geq 10$, 20 or 30. This repetition therefore takes place before the following steps that lead to the introduction into the digester, and/or before the direct introduction into the digester and/or after passing through the digester and before the resupplying thereof for the following repetition if need be.

The physical structure of the emulsion formed thus evolves as it is pressurized and depressurized before the rest of the methanization process and thus leads to a phenomenon favorable to the formation of bubbles of various sizes, namely small bubbles resulting from the gas or air dissolved at the pressure of the reactor and larger bubbles resulting from the enlargement linked to the vacuum pressure of the existing bubbles in the reactor.

It is observed that this dispersion is highly favorable to the flotation of the emulsified mass.

Advantageously, this initial step or these initial steps on the sludge are followed, before supplying the digester, by a TS/liquid separation step, for example on a press belt or simply by draining.

This supplementary step, intermediate between the repeated emulsion creation step(s) and the actual methanization in the digester, enables a thickening of the sludge.

Although this thickening appears unfavorable to a good digestion since it makes the mixing that guarantees good homogenization in the digester more difficult and expensive, it is observed that the sludge emulsion obtained has a particularly low viscosity, which compensates for this quirk and in fact enables a good homogenization of the temperatures and of the pH within the digester.

Similarly, the thickening might have suggested the existence of difficulties in supplying the decanted sludge obtained after this pretreatment.

The presence of persistent gas bubbles in the sludge (even after degassing) intended to supply the digester in fact enables the easy pumping thereof.

Gravity feeding is also possible given the low viscosity of the assembly.

It can be noted here that three parameters improve the yield of a digester:
  the intensity of the mixing. Effective mixing reduces the temperature differences, improves the concentration of organic matter in the mass of the digester, homogenizes the pH and multiplies the chances of reaction of encounters between microorganisms and the organic matter to be degraded;

the regularity of the supply. It is important to ensure the provision of a regular organic feedstock in order to prevent stops and starts in the development of the microorganisms;

the concentration, the nature and the structure of the organic matter are also important in order to obtain high yields which are only attainable with high contents of organic matter.

The invention, on the one hand by increasing the density of TS and on the other hand by preserving a good viscosity, will allow the optimization of these three parameters.

As has been seen, a good viscosity specifically allows a better mixing and a regularity of supply.

It should be noted here that the supplying of the digester from this preparation step will be able to be carried out continuously or semi-continuously.

The term semi-continuously is understood to mean in successive batches, which are replaced one after the other continuously, or substantially without stopping, to enable the continuous or semi-continuous treatment, consequently allowing an excellent output.

Furthermore, the pressure/vacuum pressure actions described above improve the nature and the structure of the organic matter which is better dispersed and better lysed as regards the bacteria, which leads to a better accessibility and biodegradability of the organic matter by increasing the possibilities of exchanges and therefore the yield of the digestion reaction and consequently methane-producing reaction.

In advantageous embodiments, one and/or another of the following arrangements is additionally and/or furthermore employed:

N≥10, for example greater than or equal to 15;

the emulsion at the outlet of the reactor is degassed before the next step;

no flocculant is injected into the emulsion at the outlet of the reactor, and before introduction into the methanizer;

a flocculant is injected into the emulsion at the outlet of the reactor, before the next step in order to form a floc. In the case where the initial step is repeated, this addition of flocculant is carried out after the repeated initial steps.

the flocculant is a polymer injected at the immediate outlet of the reactor, before the venting.

In another embodiment, the injection of polymer is carried out after the venting. The flocculant is for example an organic flocculant of cationic type;

the flocculated sludge emulsion is concentrated by flotation/settling of the flocculated emulsion in a vessel serving as a concentrator, the concentrated sludge being continuously discharged to the digester for example by overflow;

the sludge is fed into the pressurized reactor via an element of small diameter $\underline{d}$ (for example $\underline{d}$<50 mm or 1 cm) through which the sludge passes at high velocity $\underline{v}$ (for example $\underline{v}$>10 m/s) and at low pressure $\underline{p}$, into which element the gas or air is injected at high flow rate (for example at a flow rate q $Nm^3 \geq 10$ Q $m^3$, Q being the flow rate of the sludge), in order to create the compressible gaseous emulsion which then supplies the downstream reactor of larger diameter D (D>20 $\underline{d}$) than the element through which the emulsion passes, at a higher pressure P (P>$\underline{p}$, for example P>2 bar and advantageously P 10 bar and <20 bar or 15 bar), and at a lower velocity V (V<$\underline{v}$), before being subjected to a pressure drop in the downstream member, for example formed by a ball valve or a globe valve or a sleeve valve.

The particularly reduced size of the injection zone (for example 0.001 $m^3$) will allow excellent sludge/air mixing.

Therefore, there is specifically at this location a high-speed zone, leading to kinetic impacts, which enable the sludge to disperse in the gas;

the element of small diameter is a Venturi;

the air is injected in the direction of the flow and/or against the flow of the sludge and/or injected with an angle of between 20° and 90°, for example 30° or 45° with the direction of the flow of sludge;

the emulsion the floc is degassed by soft impact of the emulsion of the floc against itself or against an energy-absorbing flap for decelerating the floc;

the emulsion or the floc thus matured is recovered in order to pass it through a filtration and/or settling/maturing device for discharging to the digester.

The term energy-absorbing is understood to mean arranged in order to reduce the kinetic energy of the floc by a factor at least equal to 2.

This is an impact of liquid/liquid type.

Such soft and partial degassing of the excess air does not damage the emulsion and will make it possible to then better flocculate it using the energy of the degassing, which enables a decrease of 10% to 20% or even up to 50% in the mixing time of the polymer and also a reduction in the amount of polymer to be used.

Above all, this excellent degassing of the air while retaining in the treated sludge its low viscosity and its workability (easy pumping) makes it possible to minimize the amount of oxygen injected into the methanization, the presence of which the anaerobic bacteria do not like.

A soft impact is understood to mean a gradual impact or contact without percussion either against the emulsion or the floc itself by falling by gravity onto itself for example, or onto a flap or partition or disk for absorption of the energy, for example a flap which is flexible, or has a reduced size of for example a few $cm^2$, (for example of x×y, where x and y<10 cm), arranged to decelerate the flow, without however constituting an irregularity that creates a sudden excess pressure in the flow.

A flexible flap or partition is understood to mean an elastic or semi-rigid element, for example made of rubber or the like, suitable for withstanding and/or creating a pressure drop, by deceleration, enabling pressure degassing, without however destroying flocs of sludge.

Such a system enables the degassing of the excess air while ensuring the continuity of constitution of the emulsion or of the floc and the compliance with the rates of flow or transfer of the emulsion during the process.

Regarding the polymer, conventionally the operator will have a tendency to provide it in excess in order to obtain a floc that is certainly heavier, but that does not run the risk of breaking up.

With this embodiment of the invention, this risk is considerably minimized, since, by improving the flocculation process in a simple manner by using the degassing energy, the operator of a plant is no longer inclined to over-dose.

Specifically, results are obtained on the treatment lines that make it possible to save up to 30% of flocculant.

The invention also proposes a device implementing the processes as described above.

It also proposes a device for methanization starting from an organic sludge comprising, in a known manner, a digester, characterized in that it additionally comprises a reactor upstream of the digester, means for supplying sludge to said reactor comprising an element of small diameter $\underline{d}$ (for example $\underline{d}$<50 mm or 1 cm) or injector, means for injecting a gas or air into said injector in order to create a compressible gaseous emulsion, arranged to supply the downstream reactor of larger diameter D (D>20 $\underline{d}$) than the element of small diameter, a member that generates a pressure drop at the outlet of the reactor, means for transferring the sludge to the digester and margins for recycling the sludge upstream and/or via the digester.

In one advantageous embodiment, the invention furthermore proposes a degassing chamber equipped with mixing means which is located downstream of the reactor.

Advantageously, the recycling means are located upstream of the digester, and comprise an intermediate buffer tank of sufficient volume to allow N recycling operations.

Also advantageously, it comprises means for circulating in a loop the emulsion obtained at the outlet of the member, via the digester.

In one advantageous embodiment, the device comprises means for injecting a flocculant after the pressure-drop-generating member (but before recirculation branch connection).

Also advantageously, it comprises means for degassing the emulsion or the floc at atmospheric pressure by soft impact of the emulsion or of the floc against itself or against a flexible partition.

Advantageously, the degassing means comprise a container open to atmospheric pressure and a supply of the emulsion or the floc by exiting of the emulsion or of the floc vertically or substantially vertically as a fountain into said container open to atmospheric pressure.

Also advantageously, the degassing means comprise an enclosure for passage of the emulsion or floc equipped with an intermediate inlet chamber comprising a partition for decelerating the flow.

Advantageously, the partition is flexible and/or curved (for example with a radius of curvature of several centimeters, for example between 5 cm and 100 cm), with a peak pointed toward the flow.

Advantageously, and only in the case of adding flocculant, a vessel is furthermore provided at the outlet or downstream of the reactor that serves as a concentrator and is arranged to enable the flotation of the flocculated sludge over a given height.

The invention also proposes a soup or emulsion of organic sludge obtained after N recirculation passes through the reactor described above, with N≥4, for supplying the digester, and advantageously N≥7.

Advantageously, the organic sludge soup comprises at least 80% of lysed bacteria. Such a result, which depends on the initial state which may already be from 20% to 30% lysis, has never been achieved to date.

Lysed bacteria should be understood to mean a bacterium whose cell membrane has been destroyed, causing the death thereof.

During the pretreatment of the sludge, the introduction of gas into the sludge combined with a low residence time of the mixture in the reactor (several seconds, for example from 1 s to 10 s) gives rise to the extraction of small molecules, such as $H_2S$ and $NH_3$, which is favorable to the methanization, these toxic substances then being in excess.

The invention will be better understood on reading the following description of embodiments given below by way of nonlimiting examples. The description refers to the accompanying drawings, in which.

Figure 3:
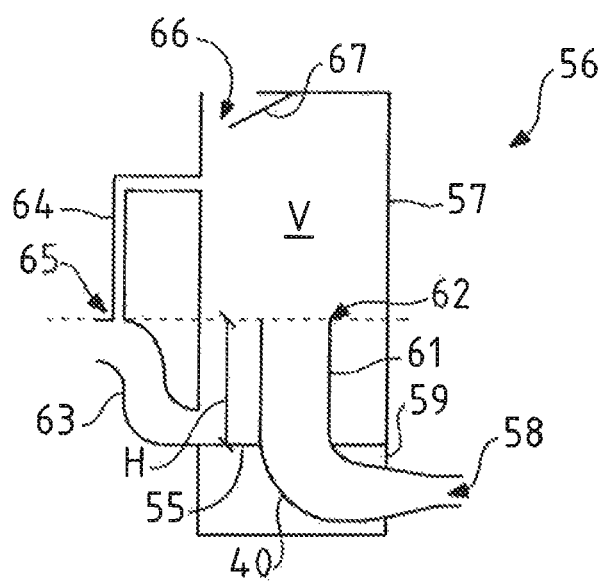

FIG. 3 schematically illustrates, in cross section, the degasser/maturing unit of the device according to the embodiment of the invention more particularly described here.

Figure 3A:
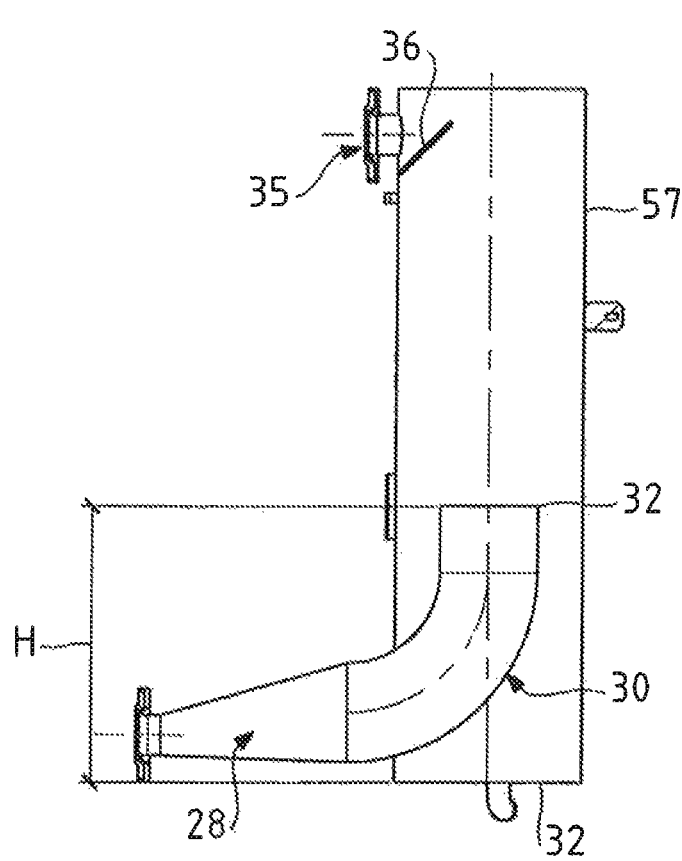

FIG. 3A is a front view of an embodiment of the degasser/maturing unit of the device of the type described with reference to FIG. 3.

Figure 3B:
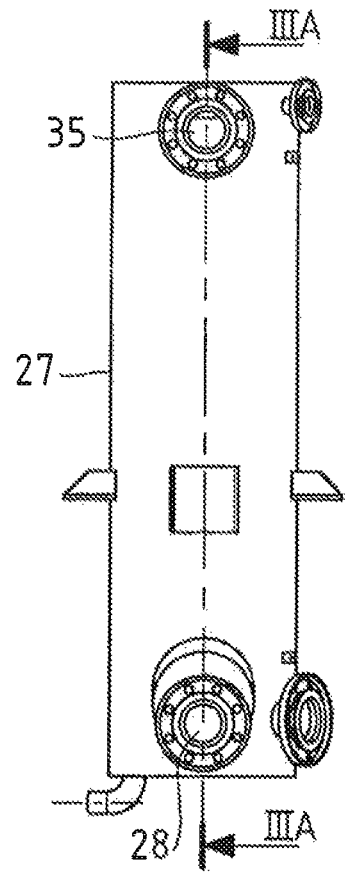

FIG. 3B is a cross-sectional view along IIIA-IIIA of FIG. 3A.

Figure 4:
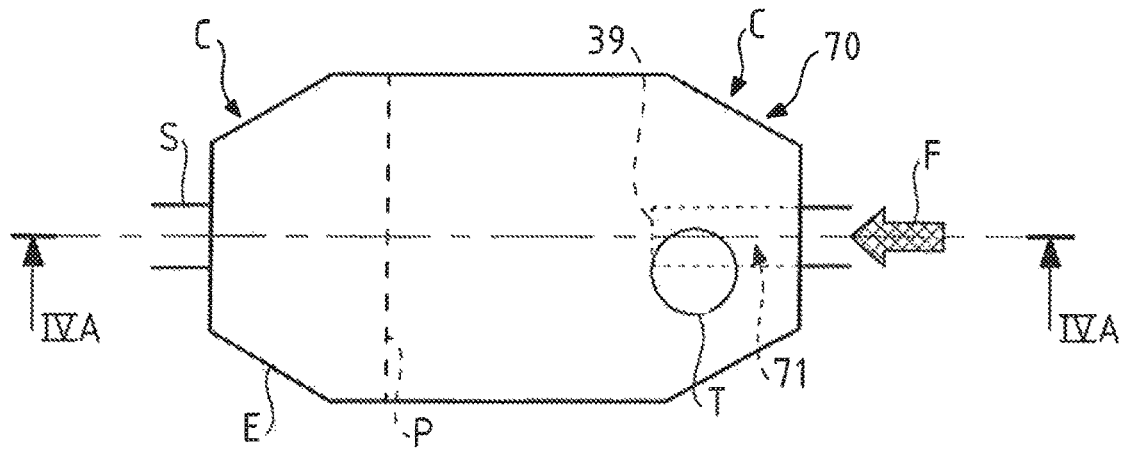

FIG. 4 is a top view of another embodiment of the degasser/maturing unit with a decelerating partition.

Figure 4A:
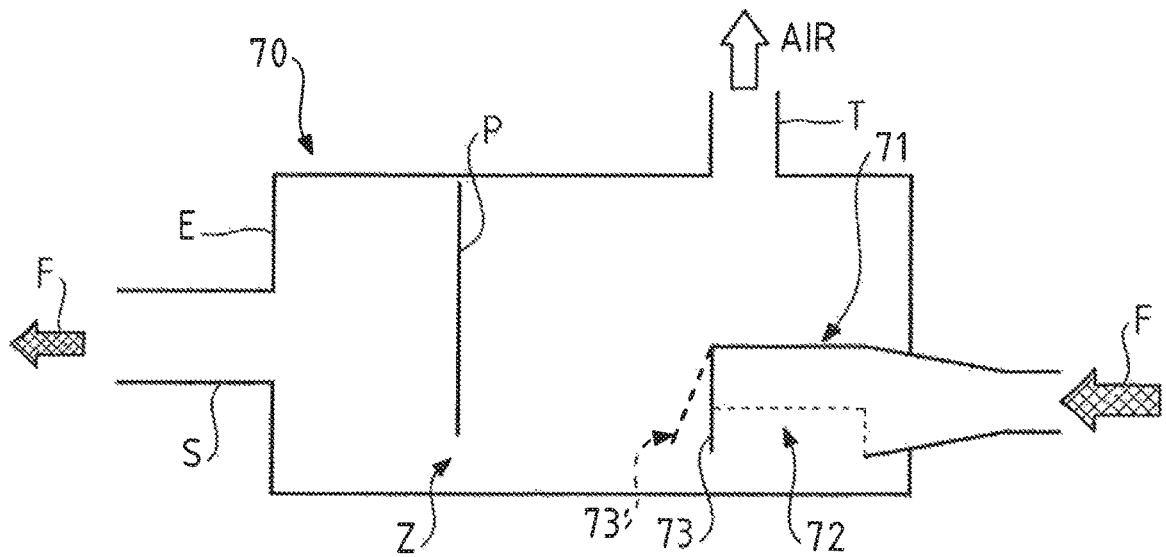

FIG. 4A is a cross-sectional view along IVA-IVA of FIG. 4.

Figure 4B:
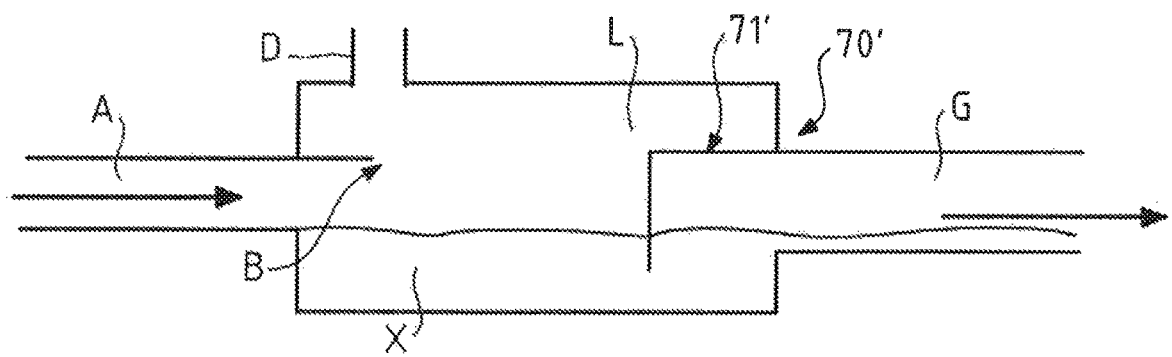

FIG. 4B illustrates a variant of a degasser/maturing unit.

Figure 5:
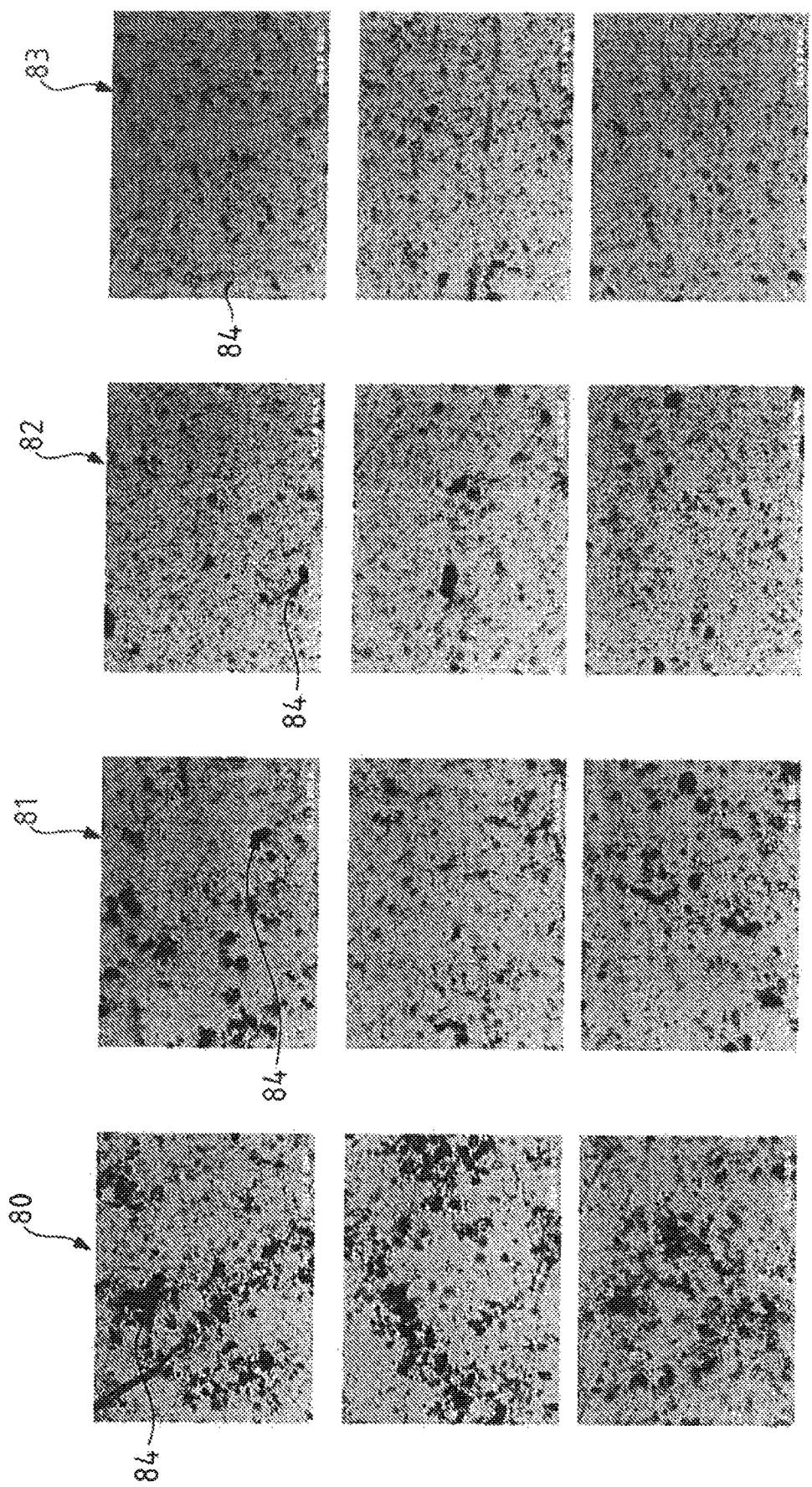

FIG. 5 illustrates the dispersion of the organic material obtained after no pass and one, eight and ten passes of the initial step according to the invention, on a liquid sludge not thickened by flocculation.

Figure 6:
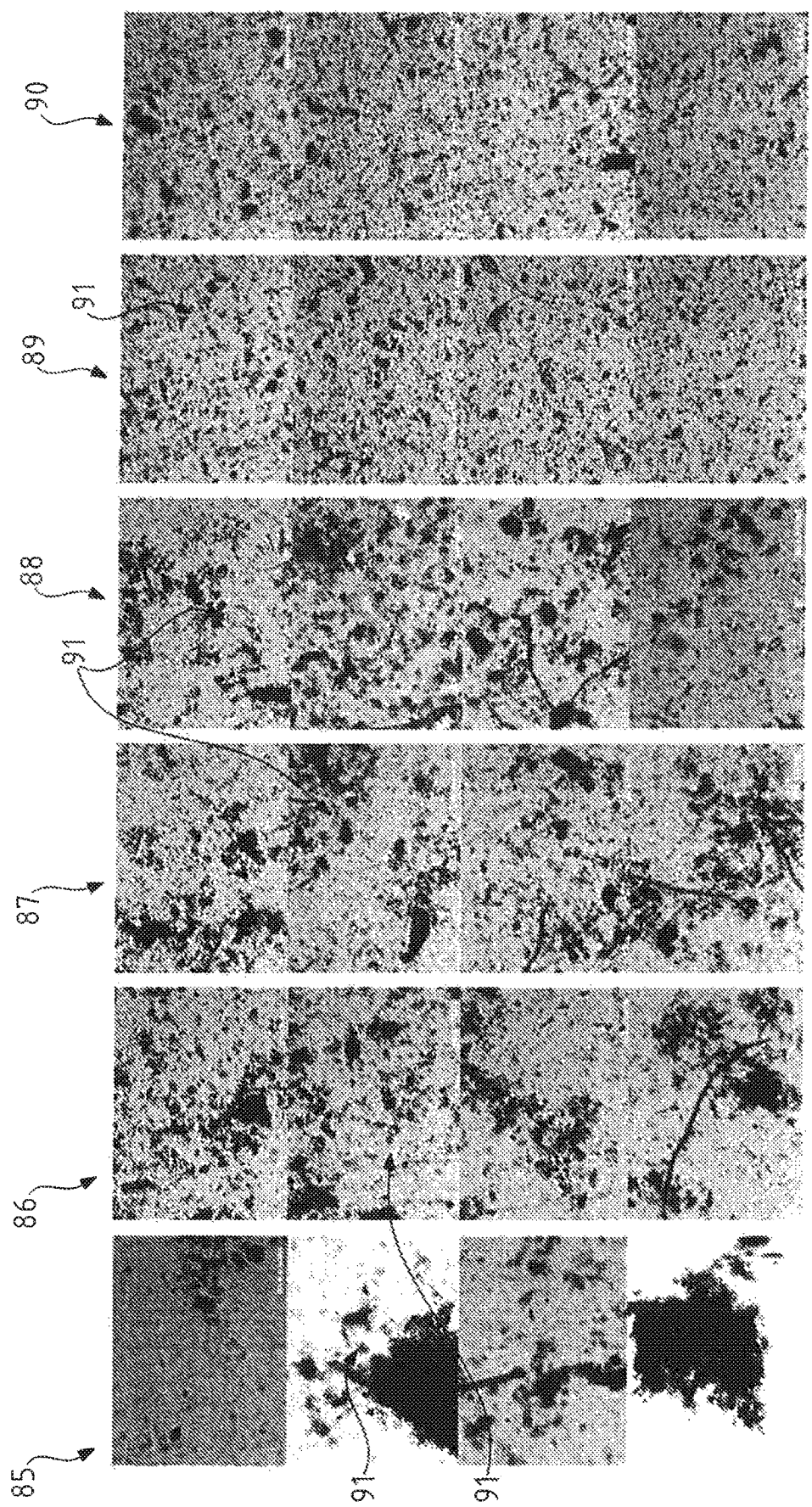

FIG. 6 illustrates the dispersion of the organic material obtained after no pass and one, eight and ten passes of the initial step according to the invention, on a liquid sludge thickened by flocculation.

Figure 7:
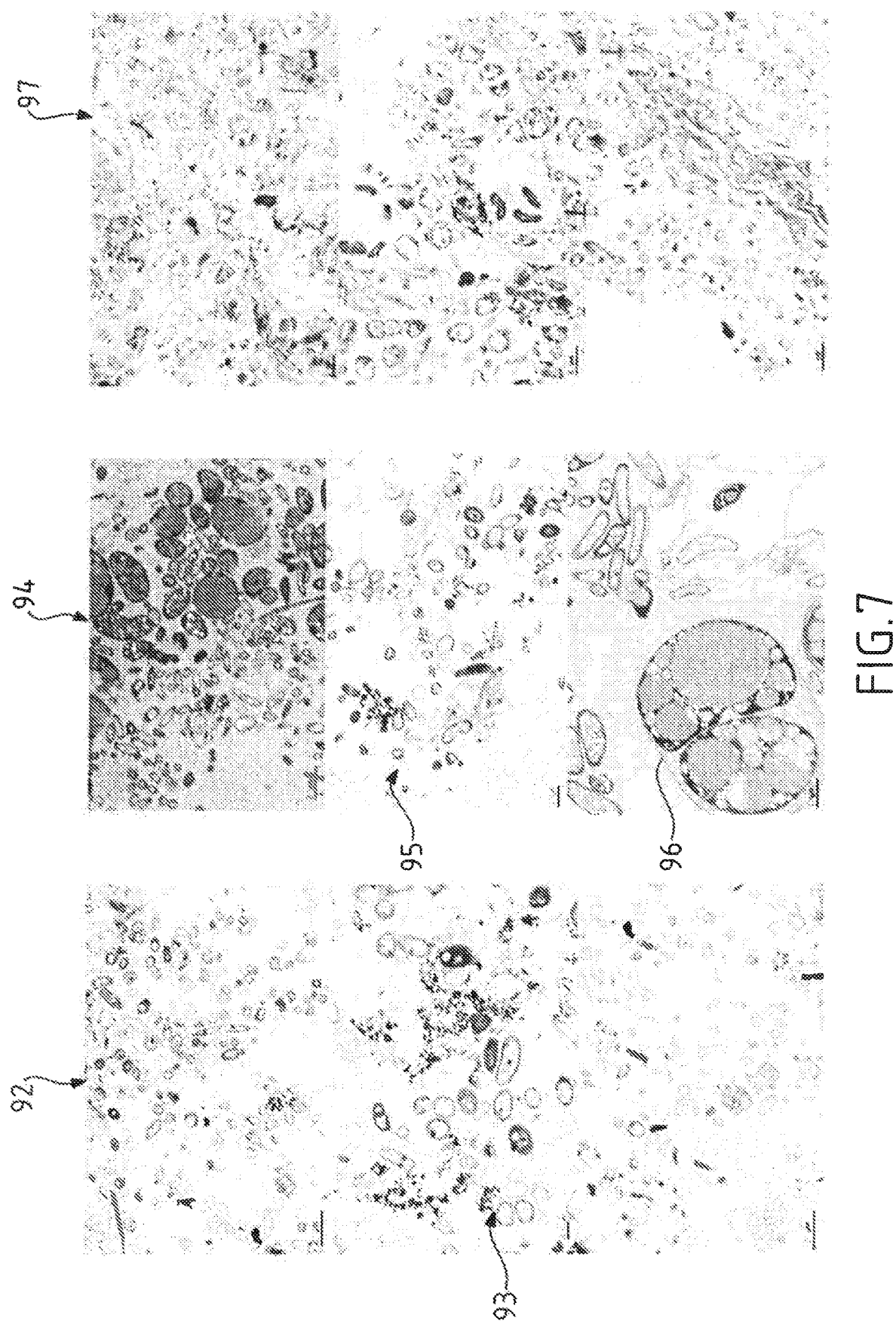

FIG. 7 illustrates the porosity and the structure of the bacterial floc, the size of the aggregates that it contains and also the EPS structure (EPS is the organic and mineral coherent structure that makes it possible to maintain the mechanical stability of the bacterial flocs) after no pass, one pass and eight passes of the initial step according to the invention, on a liquid sludge.

Figure 8A:
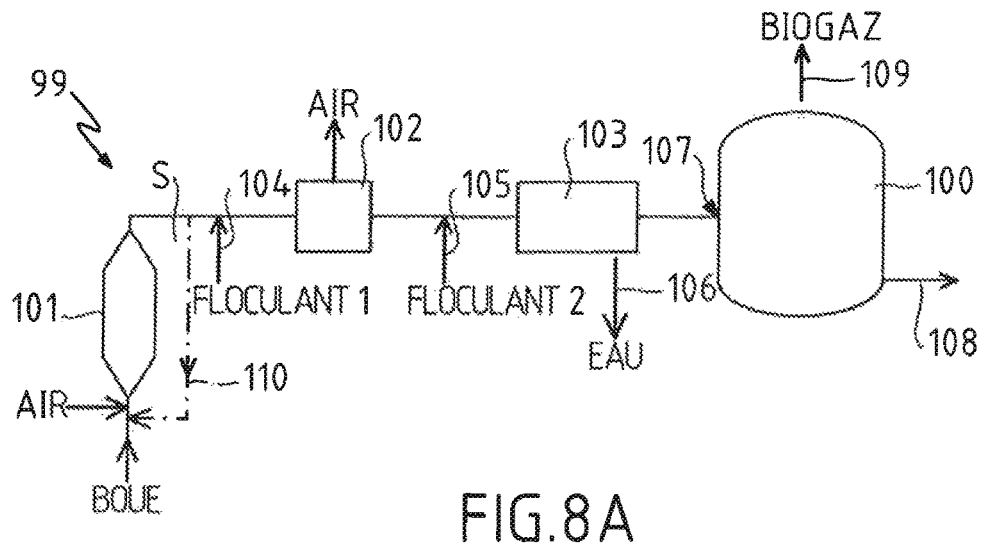

FIG. 8A shows another embodiment of a device according to the invention.

Figure 8B:
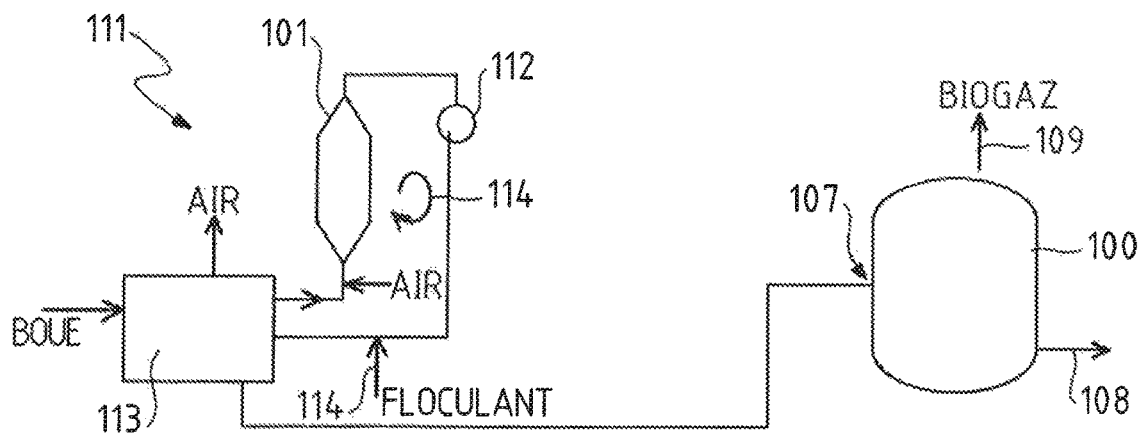

FIG. 8B shows another embodiment of a device according to the invention.

Figure 8C:
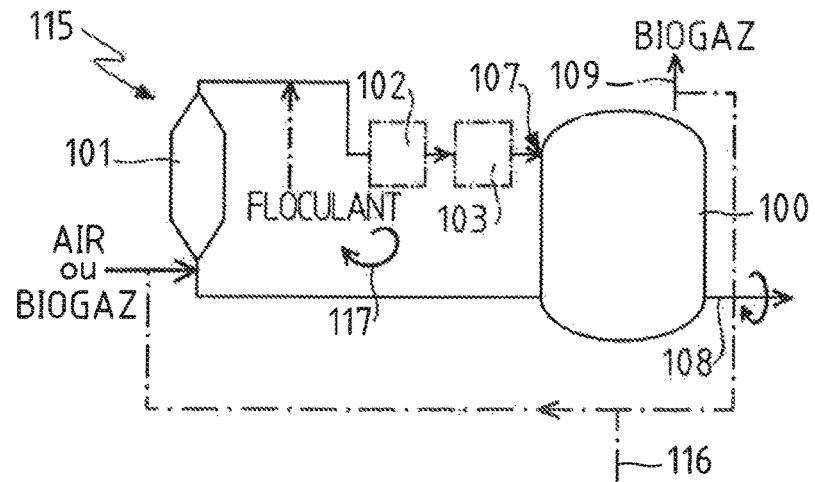

FIG. 8C shows another embodiment of a device according to the invention.

Figure 1:
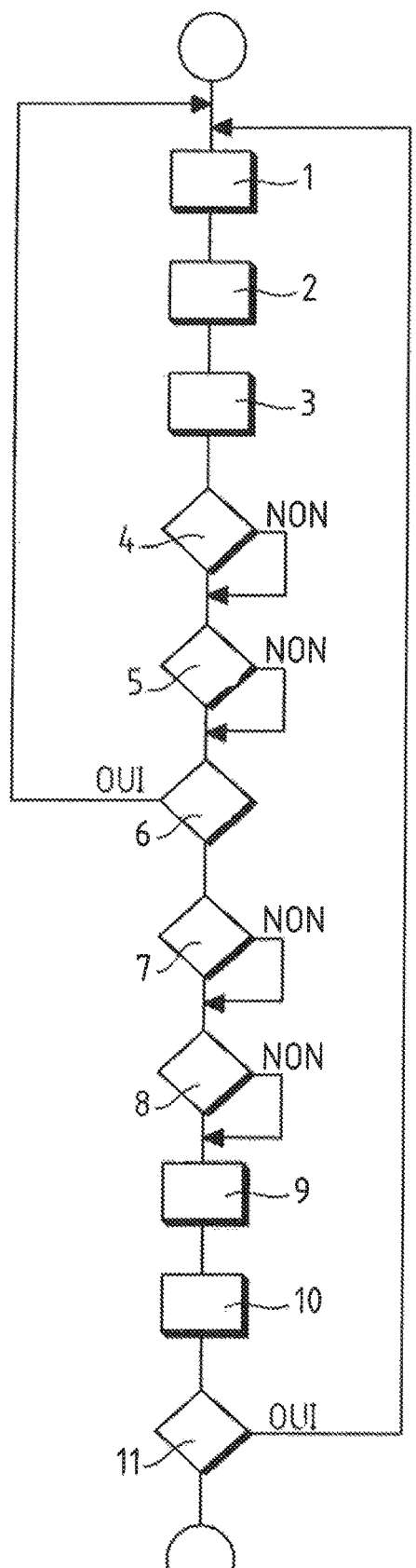
FIG. 1 is a flowchart showing the main steps of one embodiment of the process according to the invention.

FIG. 1 schematically shows the steps of the methanization process of an organic sludge according to the embodiment of the invention more particularly described here.

The organic sludge is pumped continuously from, for example, a settling tank.

According to the invention, an impact is created between the sludge and a gas (step 1) to create an emulsion which is supplied to the reactor, which is pressurized with respect to the atmospheric pressure (step 2), which is evacuated via a member that generates a pressure drop (step 3) then optionally degassed (step 4), optionally flocculated (step 5), and it is decided (test 6) to repeat the preceding steps 1 to 5 in order to carry them out N times in total with N≥2 or 3, for example N=7, 8 or 10.

This process of applying pressure/vacuum pressure results in a lysis of several tens of percent of the bacteria of the medium, which may reach 80% to 90% if steps 1 to 5 are repeated in sufficient number and depending on the desired lysis result.

This lysis takes place owing to the macroscopic conditions of the medium in which the bacteria are present.

The local energy conditions used are also quite low and make it possible to prevent the undesired production of non-biodegradable resistant organic molecules, unlike the other prior art techniques (ultrasonic cavitation, chemical and/or thermal treatments).

Figure 1A:
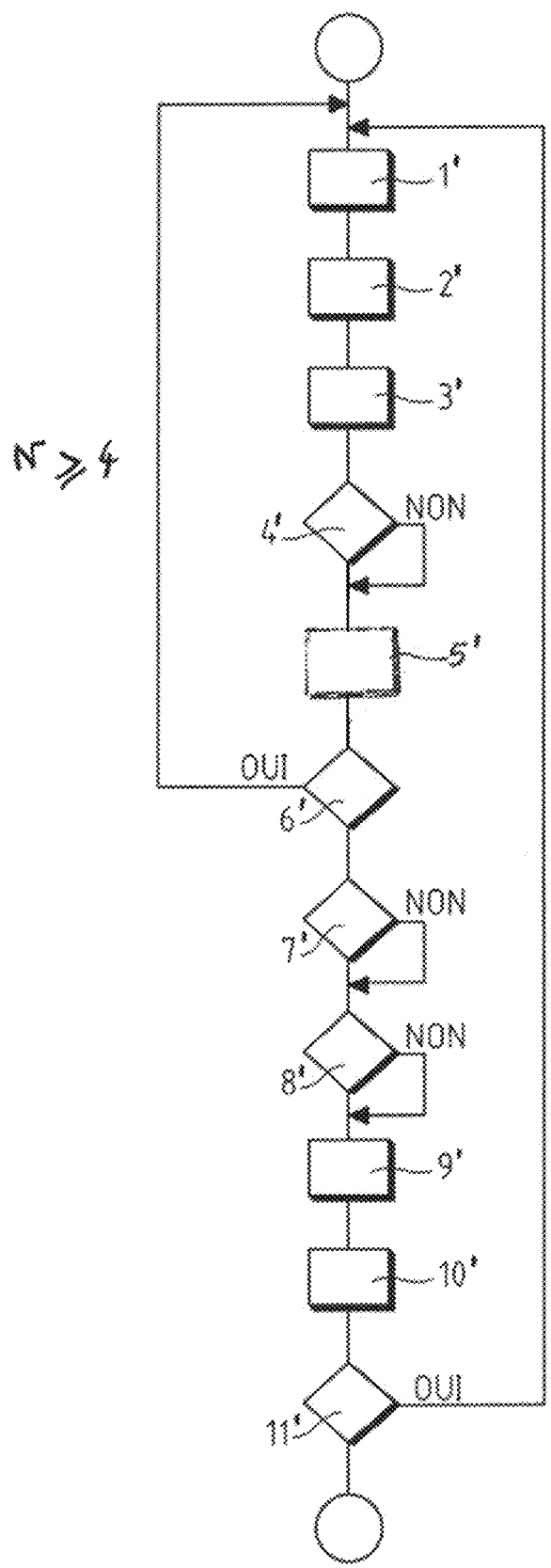
FIG. 1A is a flowchart illustrating another embodiment of the process according to the invention, without flocculation with the initial step.

Represented in FIG. 1A are steps 1' to 4' which are identical to steps 1 to 4 described above. No flocculation is however carried out here in this preferred embodiment. In contrast, a recycling reservoir is supplied at 5' which will enable circulation through the reactor at least N times. For example, for a sludge flow rate of 10 m$^3$/h, and a number N=5, a tank of 11 m$^3$/h is provided, which allows maintenance of the flow rate continuously between inlet and outlet of the reactor (knowing that the residence time in the reactor in which the recycled initial step is carried out is very low (several seconds or even several minutes)).

The technique for preparing the organic sludge before methanization according to the invention furthermore enables a greater thickening of the sludge, while maintaining a high availability of the substrates, leads to a low viscosity and therefore enables a partial lysis of the aerobic bacteria, while increasing the biodegradability of the sludge as results from an analysis of petri dish bacterial growth type (cf. Table I below) obtained with a sludge of the following composition:

VS (volatile solids) % of the total solids: 60%
VFA Volatile Fatty Acid: 185 mg/l
AGC/TAC: 0.4
pH: 6.8

In these examples, the initial step is as described with reference to FIG. 1A (without flocculation).

| Sample | E. coli (CFU/g) | Total flora (CFU/g) |
|---|---|---|
| Sludge No pass | 31 000 | 41 000 000 |
| Sludge 2 passes (20 sec) | 79 000 | 89 000 000 |
| Sludge 8 passes (80 sec) | 170 000 | 730 000 000 |
| Sludge No pass | 25 000 | 14 000 000 |
| Sludge 2 passes (20 sec) | 220 000 | 120 000 000 |
| Sludge 8 passes (80 sec) | 330 000 | 320 000 000 |
| Sludge No pass | 79 000 | 16 000 000 |
| Sludge 2 passes (20 sec) | 320 000 | 130 000 000 |
| Sludge 8 passes (80 sec) | 410 000 | 310 000 000 |
| Sludge No pass | 36 000 | 32 000 000 |
| Sludge 2 passes (20 sec) | 84 000 | 110 000 000 |
| Sludge 8 passes (80 sec) | 140 000 | 130 000 000 |

Colony Forming Unit

The initial step of creating an emulsion completely or partly comprising the steps described above is then optionally followed by a maturation step 7, then a draining/pressing step (step 8) that makes it possible to supply the digester in which the steps 9 of actual methanization take place, which are known per se, enabling the extraction at 10 of the methane-containing biogas.

A portion of the biogas may (test 11) be reused as gas for injection into the grid.

Figure 2:
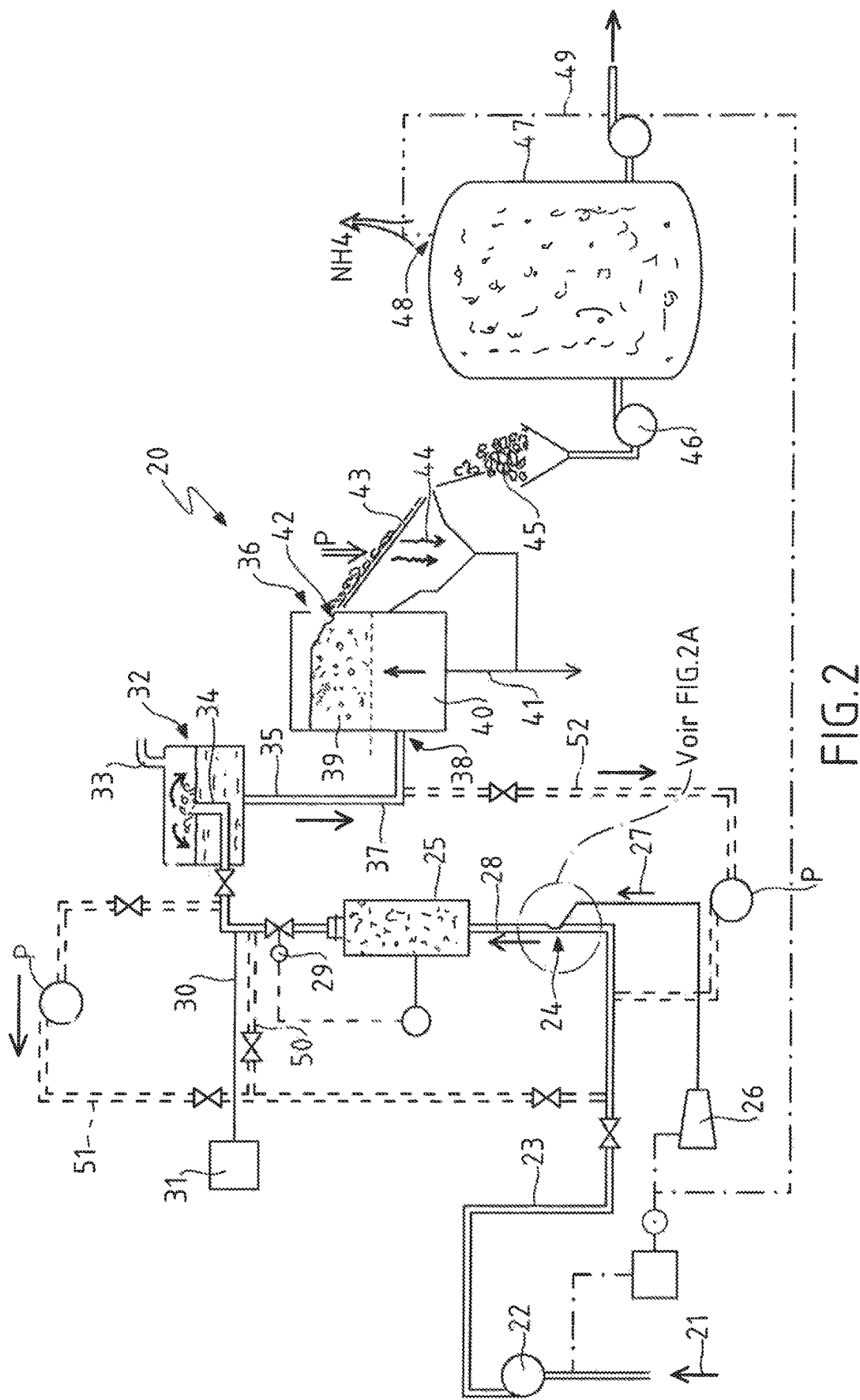
FIG. 2 is a diagram illustrating a first embodiment of a device implementing the process according to the invention.

FIG. 2 shows an embodiment of a device 20 according to one embodiment of the invention.

The liquid organic sludge 21 is introduced via a feed pump 22 and pipework 23 toward a restriction 24 for example formed by a Venturi in a tubular enclosure 25 for example having a height of 1 m and a diameter of 50 cm.

A compressor 26 feeds compressed air 27 to the inside of the Venturi 24, obliquely for example with an angle of 30° to the direction of the fluid, in order to form an emulsion 28 or a sludge/air/water three-phase mixture.

The tubular enclosure 25 is for example maintained at a pressure of the order of 1.2 to 2 bar relative or else above 2 bar.

This can be carried out by means of a regulated valve 29 as a function of the internal pressure of the enclosure. This valve 29 constitutes a restriction downstream of which, in one embodiment, a flocculant 30 is supplied via a feed-metering device 31 which is known per se.

Downstream of the flocculant supply, the emulsion thus flocculated supplies the degasser 32 according to the embodiment of the invention more particularly described here.

The degasser for the flocculated emulsion or floc is open to atmospheric pressure at 33, and comprises a vertical tube 34 for supplying floc as a fountain, enabling a soft impact of the floc against itself, which enables a given and non-destructive degassing of the flocculated emulsion.

The sludge remains inside the degasser for a given time, for example of the order of 1 to 5 minutes, then is discharged by gravity via pipework 35 to a concentrator apparatus 36.

According to the embodiment of the invention more particularly described here, a phenomenon of immediate flotation occurs in the concentrator apparatus 36, with an upward velocity in the apparatus of the large flocs, of 20 m/h, 50 m/h or even 100 m/h.

The degassed emulsion 37 thus arrives at the lower intermediate part 38 of the apparatus and immediately separates into solids 39, which rise to the surface and into transparent water 40, which is continuously discharged by gravity at 41.

The solids 39 are discharged in the upper part of the concentrator/flotation unit 36 for example via a chute 42, which enables the dehydrated sludge (solids) to be discharged by gravity onto a perforated belt 43 enabling additional filtering of the residual water (arrows 44) which is recovered in order to be mixed with the unbound water obtained at 41.

Advantageously, a pressure P is exerted on the sludge, in a manner known per se, making it possible to further increase the dehydration and the thickening of the sludge obtained at the outlet of the device.

The viscous, thickened and dehydrated sludge 45 is then recovered downstream of the belt in order to supply by gravity or by pumping 46 the digester 47 in which the metallization steps are carried out in a known manner.

The methane-containing biogas is then extracted at the upper part 48 of the degasser, of which it is possible to recycle (dot-and-dash line 49) a portion in order to supply the gas injection compressor 26 in order to create the sludge emulsion.

According to the invention, there is recirculation once or several times to the tubular enclosure 25 advantageously without flocculation (dot-and-dash line circuit 50), or during flocculation, after flocculation and before degassing (dot-and-dash line circuit 51) or after degassing (dot-and-dash line circuit 52).

Figure 2A:
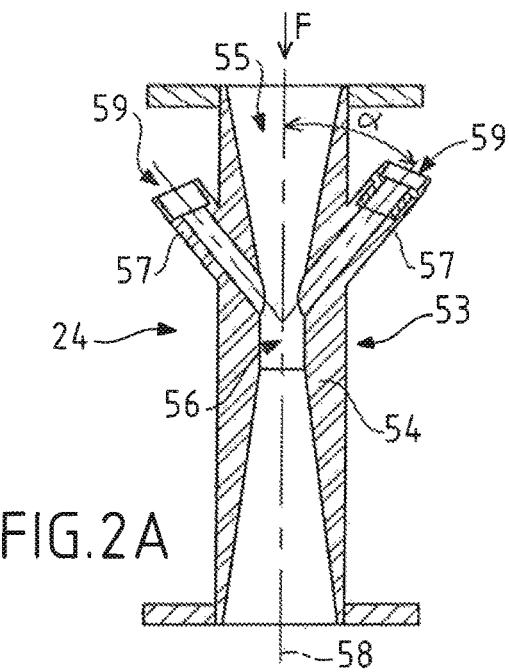
FIG. 2A shows, in cross section, an embodiment of an ejector usable with the invention in order to obtain the emulsion usable with the invention.
Figure 2B:
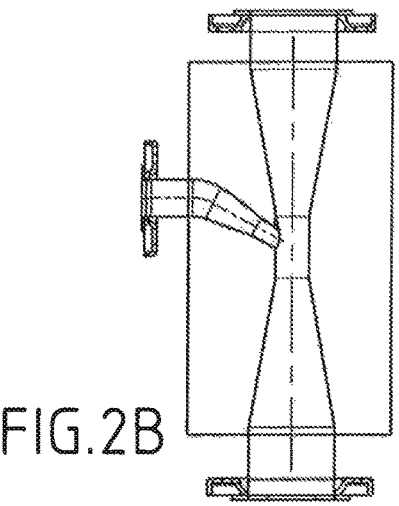
FIG. 2B shows another embodiment of an ejector usable according to the invention.
Figure 2C:
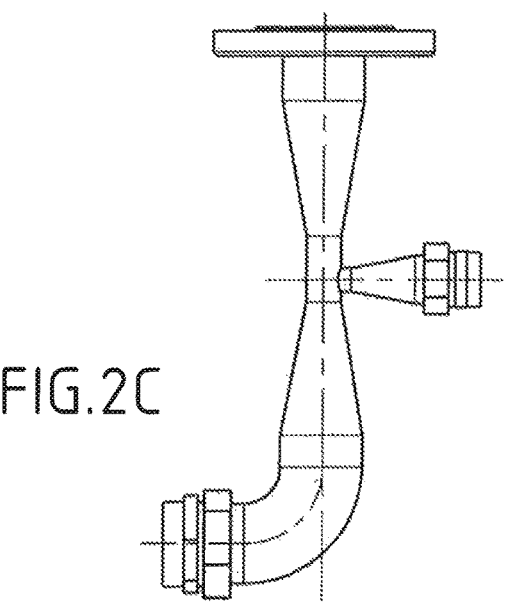
FIG. 2C shows another embodiment of an ejector usable according to the invention.
Figure 2D:
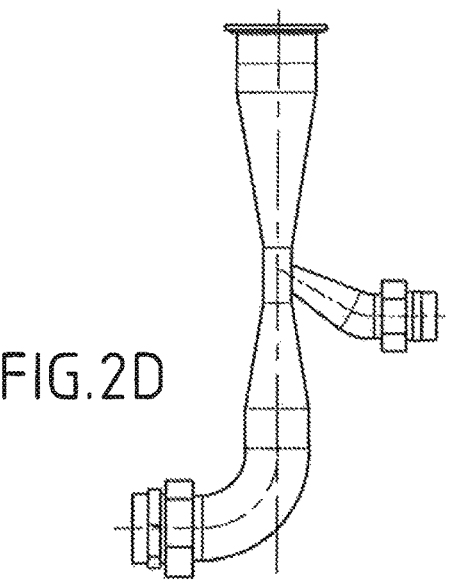
FIG. 2D shows another embodiment of an ejector usable according to the invention.
Figure 2E:
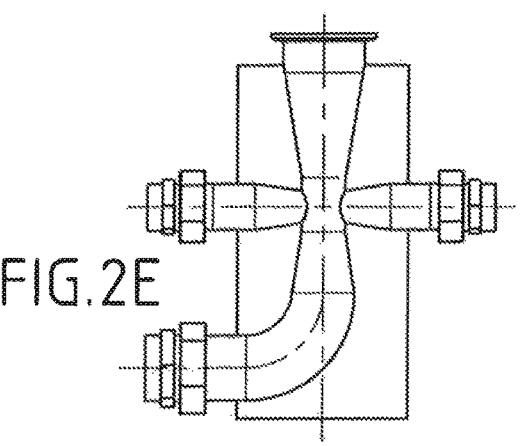
FIG. 2E shows another embodiment of an ejector usable according to the invention.
Figure 2F:
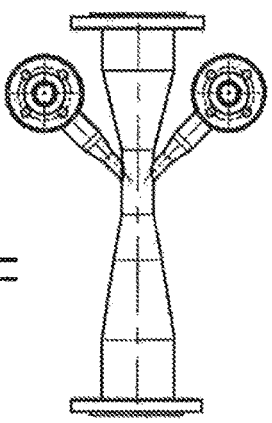
FIG. 2F shows another embodiment of an ejector usable according to the invention.

Represented in FIG. 2A is an embodiment of the restriction 24 in which the sludge/gas emulsion is produced.

The restriction is formed by a Venturi 53 comprising a hollow body 54 comprising a sludge inlet (flow F) formed by a frustoconical bore 55 opening into a cylindrical bore portion 56 of small diameter, in which two symmetrical branch connections 57, forming an angle of between 20° and 80°, for example 30° with the axial direction 58 of the Venturi, enable the supply of gas 59 in the direction of the sludge flow F.

The sludge/gas emulsion is produced in this cylindrical pruning portion for example having a volume of 1 liter, for a sludge flow rate of 50 m$^3$/h and a flow rate of injected gas, advantageously air, of 250 Nm$^3$/h.

The cylindrical bore portion opens into an inverse frustoconical portion for discharging the emulsion to the enclosure/reactor 25.

The configuration of this Venturi and of the branch connections enables emulsion velocities of greater than 10 m/s.

FIGS. 2B to 2F show embodiments of a Venturi 53 with injection of gas at the center of the Venturi, with a branch connection against the flow of sludge for example with an angle of 45° (FIG. 2B), a branch connection perpendicular to the direction of the flow (FIG. 2C), a branch connection in the direction of the flow, for example with an angle of 45° (FIG. 2D), two symmetrical branch connections that are perpendicular to the direction of the flow (FIG. 2E), or two symmetrical branch connections against the flow (FIG. 2F) for example with an angle of 45°.

FIG. 3 schematically shows, in cross section, a degasser 56 according to one embodiment of the invention.

The degasser comprises a container 57, for example which is cylindrical, having a height substantially equal to 1 m.

The diameter of the container is for example between 200 and 300 millimeters.

The sludge is supplied at 58 by pipework for example with a diameter of 80 mm which enters in the bottom part 29 of the container then has a 90° bend 60 and a cylindrical vertical portion 61 for example with a diameter of 100.

The cylindrical vertical portion 61 ends in a neck 62 for delivery of the sludge as a fountain.

The container defines an internal volume V into which the cylindrical pipework 61 opens.

The volume has a base 55 provided with outlet pipework 63 with a diameter identical to that of the inlet pipework of the flocculated emulsion.

Advantageously, a branch connection 64 is provided for additional degassing of the floc after passing through the container, in the upper part of the discharge pipework, said upper part 65 being at a height lower than the level of sludge in the container.

The height of the upper part 65 is arranged to be equal to or slightly lower than that of the neck 62, relative to the base of the volume V, to enable a given residence/maturing time of the floc in the degasser, for example 20 s.

The volume V ends in the upper part with an outlet opening 66 to the atmosphere, which is advantageously protected by a spoiler 67 for blocking sludge projections. In the embodiment as described and with the inlet/outlet dimensions of the various feed pipes of DN 80 mm, the height H of the floc enabling the maturation thereof, i.e., between the bottom of the container and the periphery of the neck of the cylindrical vertical part 61, is for example between 400 and 600 mm, for example 500 mm.

In the remainder of the description, identical reference numbers will be used to denote elements which are identical or similar.

FIGS. 3A and 3B represent another embodiment of a degasser according to the invention enabling the degassing of the floc by soft impacts of the floc against itself.

It can be inscribed within a parallelepiped of 1.50 m×1 m×600 mm, for the treatment of sludge supplied continuously at a flow rate of 20 m$^3$, using commercial pipes and/or sheets of plastic or steel, which is a great advantage.

Specifically, compared with a simple degassing by venting, or else in comparison with a degasser using mechanical mixing to detach the air from the flocs, an improvement in the flocculation time is obtained, without destroying the flocs, which may reach 20% or even 50% while producing a floc that is more stable than normal.

Thus, and for example, with a device of the type described with reference to FIG. 3, with a maximum working volume of 64 l (400 mm×400 mm square base), an inlet bend of DN 120 mm and an operation between from 5 to 12 m$^3$/h (with an air flow rate at 30 Nm$^3$/h), a better, very consistent and floating floc is obtained, this being obtained much more rapidly than with the prior art. This emerges in particular from table II below, which also specifies the conditions of fountain height of fall H (governing the soft impact).

TABLE II

| Flow rate m$^3$/h | Working Volume (l) and working residence time (s) | Elevation of the fountain relative to the base (H) |
|---|---|---|
| 5 | 58/42 | 35 to 40 |
| 5 | 58/42 | 35 to 40 |
| 5 | 58/42 | 35 to 40 |
| 10 | 60/22 | 40 to 45 |
| 10 | 60/22 | 40 to 45 |
| 10 | 60/22 | 40 to 45 |
| 12 | 62/19 | 45 to 50 |
| 12 | 62/19 | 45 to 50 |
| 12 | 62/19 | 45 to 50 |

FIGS. 4 and 4A show, in top view and in cross section along IVA-IVA, an example of a degasser/maturing unit 70 according to another embodiment of the invention, comprising an enclosure E for example of parallelepipedal shape with cut-off corners C, positioned horizontally with respect to the inlet of the sludge flow F, for example of dimensions L×w×H: 300×400×300 for a treatment flow rate of 10$^{-13}$ m$^3$/h, a TS of 8 to 10 g/l and a Veff of 30 liters.

The Veff: (effective volume) is a volume of sludge/water at the inlet of the demodulator which makes it possible to absorb the energy necessary for the propagation and maturation of the emulsion.

This volume varies depending on the various sizings.

It is around, and for example, 30-40 liters.

The enclosure E comprises an inlet of the flow which opens into a flow chamber 71, which is for example cylindrical, having a cylinder portion 72 open in the bottom part, over the entire length of the chamber (for example 200 mm in the above numerical example) and equipped at its end in the horizontal direction with a partition 73, suitable for decelerating the floc or, when the partition is flexible, for moving inward 39' under the gentle pressure of the floc F.

The enclosure comprises, toward the top, a tube T, for discharging air from the degasser, and an outlet orifice S at the other end. The enclosure E may or may not have, for example at ⅔ of its length, an intermediate distributing partition P, enabling the floc to be discharged in the bottom part, through an enlarged slit Z.

Such a partition either enables direct deceleration of the floc or further increases the homogeneity of the emulsion.

Represented in FIG. 4B is a variant of the degasser/maturing unit 70' according to another embodiment of the invention, in the longitudinal direction.

If in the case of use of a degasser in combination with a flotation unit as described below the internal partition intended to absorb the impact of the mixture may advantageously be made of rubber or another soft material, in the case of use with a belt filter, as additional treatment, use will be made for example of a stiffer partition, for example of more or less convex shape, which may break up the floc produced slightly but not completely, simply reducing the size of the floc and thus making it more compressible.

More specifically, the variant of FIG. 4B shows an inlet A of the emulsion and of the excess gas to a zone B of the enclosure 70' filled with sludge X in the bottom part and with gas in the top part.

Zone B is closed by a partition L that absorbs the energy of the flow, a flexible or hard partition (advantageously which is convex).

The excess gas is extracted from the gas overhead by venting/a vent D.

The extraction of the liquid flow underflowed via the partition V is carried out through the zone G which provides a calm laminar flow, at for example less than 1 m/s enabling the porous floc to be put into suspension.

For 20 to 23 m³/h of sludge loaded between 10 and 30 g/l and with up to 100 Nm³/h of air added in order to form the emulsion, the enclosure has for example dimensions of LxwxH=500x200x250, with penetration into the enclosure by the outlet tube of 130 mm and an absorbent partition height of 160 cm.

Owing to the device according to the embodiment more particularly described with reference to FIG. 2 (but also with reference to FIGS. 8B and 8C below in the case of absence of flocculation) and before degassing, if necessary, liquid sludges are obtained that show an increased dispersion, with each pass through the enclosure 25, which will enable a better accessibility for the anaerobic bacteria when the sludge thus treated ends up in the digester.

A dispersion of the matter is thus obtained (see photographs from FIGS. 5 and 6) which improves with each pass, in comparison with an absence of pretreatment according to the invention, without flocculation (FIG. 5) or with flocculation (FIG. 6).

More precisely and with reference to FIG. 5, columns 80, 81, 82 and 83 show the dispersion of the organic material 84 respectively after zero passes, one pass, eight passes and ten passes. It is observed that the material is increasingly dispersed with each pass, which therefore enables a better availability of the bacteria in order to be sent to the digester.

Similarly, represented in FIG. 6 in columns 85, 86, 87, 88, 89 and 90 is the dispersion of the organic matter 91 in a thickened sludge after a flocculation carried out with no pass (85) through the enclosure 25, after two passes (86); four passes (87), six passes (88), eight passes (89) and ten passes (90).

Here too, the dispersion is considerably improved as a function of the number of passes, the dispersion however becoming more or less stable after eight passes.

A destruction of the walls of the bacteria also takes place in a particularly favorable manner (destruction of the membrane walls) (see FIG. 7).

With no pass (column 92), the bacteria 93 are alive. After one pass (94), the degree of lysis of the bacteria 95 is already greater than 30% (see destruction/rupture of the membranes 96).

After eight passes (column 97), the degree of destruction (lysis) is greater than or equal to 80%, the size of the aggregates being further reduced, which here too enables a better digestion of the organic matter released by the digester.

FIGS. 8A to 8C show three other embodiments of a methanization device according to the invention.

In the device 99 from FIG. 8A the digester 100 is directly supplied from the reactor 101 via a degasser 102 and a maturing unit 103 with introduction of a first flocculant 104 between reactor and degasser, and addition of a second flocculant 105 between degasser and maturing unit, this degasser and this maturing unit being for example of the types described with reference to the preceding FIGS. 2 to 4B.

The separated water is recovered at 106 after separation/maturation at 103 before injecting the floc at 107 into the digester 100.

After a digestion time of several days in the digester, the digestate is discharged at 108 and the biogas is recovered at 109.

With the embodiment of FIG. 8A, and for a 3000 m³ mesophilic digester (operating temperature: 37.5° C.; pH=7.4; mean residence time: 16.3 days, charge of 2.5 to 3.4 kg of VS (volatile solids) per cubic meter per day and a flow rate of between 160 and 220 cubic meters per day, it is possible for example to provide the dimensions and operating parameters of the reactor 101 corresponding to tables III to VI below.

These have been observed with a biological sludge, the initial characteristics of which are in particular the following:

VS volatile solids (% of total solids): 60%
VFA volatile fatty acid: 185 mg/l
TAC total alkalinity: 500 mg/l
AGC/TAC: 0.4
pH: 6.8

TABLE III

| Part | Member | Diameter (in mm) | Length (in mm) |
|---|---|---|---|
| 1 | Before air injection | 65 | 0.168 |
|   | After air injection | 15 | 0.10 |
| 2 | Reactor | 300 | 0.51 |
| — | Between 2 and 3 | 50 | 0.70 |
| 3 | Expansion valve | 50 | 0.26 |

TABLE IV

| Parameter | Unit | Value |
|---|---|---|
| Reactor pressure | Bar | 3.5 |
| Air flow rate | Nm³/h | 30 |

TABLE IV-continued

| Parameter | Unit | Value |
| --- | --- | --- |
| Sludge flow rate | m³/h | 8 |
| Air/sludge ratio | (Nm³/h)/(m³/h) | 3.8 |

TABLE V

| Part | Member | Velocity (m/s) | Residence time (s) | Total residence time (s) |
| --- | --- | --- | --- | --- |
| 1 | Before air injection | 0.7 | 0.25 | 0.254 |
|   | After air injection | 24 | 0.0042 |   |
| 2 | Reactor | 0.1 | 7.24 | 7.24 |
| — | Between 2 and 3 | 2.5 | 0.28 | 0.28 |
| 3 | Expansion valve | 2.5 | 0.10 | 0.1 |

TABLE VI

|   | 1 pass | | 8 passes |
| --- | --- | --- | --- |
| Outlet | A | B | B |
| Velocity (m/s) | 24 | 2.5 | 2.5 |
| Residence time (s) | 0.254 | 7.874 | 62.992 |

The measurements with a Rheomat RM 180 relative viscometer on sludge at 75 g per liter, before (i.e. on the sludge that is flocculated but not treated by the invention) and after (i.e. passed once by the invention after flocculation of the sludge) are:

14.6 Pa·s and 5.8 Pa·s
19.8 Pa·s and 11.6 Pa·s
18.3 Pa·s and 9.2 Pa·s
16.5 Pa·s and 7.7 Pa·s FIG. 8B shows another embodiment of a device 111 according to the invention.

Here, this is a more simplified solution for producing a non-flocculated emulsion upstream of the digester, comprising a pump 112 for recirculating the emulsion to a storage tank 113, enabling a given number of passes through the tank, for example 8 (arrows 114).

Here too, this makes it possible to obtain a very low viscosity (with or without flocculation at 114) of the emulsion produced from a sludge of given characteristics.

For example, starting from a raw sludge which is thickened (for example by pressing) of 46.2 g per liter, with an initial viscosity of 30.98 Pa·s, it is possible to obtain after a single pass and taking into account the following parameters:

TABLE VII

| Velocity in injector | Air Nm³/s/ sludge m³/s ratio | Tank pressure | Viscosity |
| --- | --- | --- | --- |
| 33 m/s | 3.75 | 1.5 bar | 22.5 Pa.s |
| 26 m/s | 5 | 4 bar | 23.1 Pa.s |

FIG. 8C shows a third embodiment of a device 115 according to the invention, in which the emulsion, not flocculated but obtained from a nonoxynol gas obtained by means of the digestion (dot-and-dash line 116), is intended this time for recirculation to the digester itself (arrows 117).

In embodiments, degassing (dot-and-dash line 102) and/or maturing (dot-and-dash line 103) are carried out before reinsertion into the digester.

The treatment of FIGS. 8B and 8C, without flocculant, enables an improvement in the constitution of the sludge which unexpectedly favors an optimized operation of the digester.

The implementation of the process according to the embodiment of the invention more particularly described here will now be described with reference to FIG. 2.

The sludge 21 is supplied with a continuous flow rate by pumping at a flow rate Q, for example of 20 m³/h, through a pipe for example with a diameter DN50, and a length l equal to a few meters. Simultaneously, a large flow rate of air, for example 60 Nm³/h, is injected continuously into the Venturi 24, which creates the three-phase emulsion, which then enters into the enclosure 25 with suppression. The emulsion then passes through the restriction 29, for example a gate/valve, giving rise to a new pressure/vacuum pressure shock.

Advantageously, this cycle of injection of air, decompression in the enclosure and restriction is repeated at least N times with N≥2 or N≥7.

A flocculant, at the necessary treatment content, is then introduced to create the highly aerated floc.

This rains down into the degasser container 32.

The soft impact of the floc against itself allows good degassing without damaging the floc, which remains, given the dimensions of the bent tube, the volume V and the flow rates, only for a few seconds (to a few minutes) in the container before being discharged, which leads to excellent maturation.

The matured floc is then transferred by gravity to the flotation unit/separator 36 in which the floc rises virtually instantaneously to the surface of the unbound water (a few seconds) which leaves a more or less defined flotation line. The very clear unbound water is discharged downward.

The (viscous) floc is itself discharged via the top by overflow and by gravity entrainment, or by a drum, in order to be additionally pressed, then discharged at 46 by gravity by pumping into the digester 47.

The digestion operations, which are known per se, are then carried out for several days, for example 15 or 16 days in the digester.

The complex organic matter, the biodegradability of which has been considerably improved by the upstream treatment described above, is then hydrolyzed by means of hydrolytic bacteria, which converts it into simple organic matter.

Acidogenesis reactions are then carried out by means of acidogenic bacteria, converting the simple matter into organic acid and alcohol, which are in turn attacked by acetogenic bacteria to give, in a known manner, acetates, hydrogen and $CO_2$.

The next step is that of methanogenesis leading, in particular by means of homoacetogenic bacteria, to the formation of methane, carbon dioxide (the two forming, with the residual hydrogen, biogas) and water.

In the embodiment more particularly described and with a biological sludge having average characteristics as specified above, (see the description of tables III to VII) an improvement is obtained, all other things being equal, of the order of 10% or even more, in methane production.

Needless to say, and as also emerges from the foregoing, the present invention is not limited to the embodiments more particularly described. On the contrary, it encompasses all the variants and in particular those in which the whole device is mobile, for example by being mounted on a truck trailer, given its very great compactness. This allows it to be transported from one site to another as required.

The invention claimed is:

1. A methanization process, starting from an organic liquid sludge, comprising:
    creating an hydrolyzed sludge emulsion by performing a first cycle followed by at least 6 additional cycles, wherein:
        the first cycle comprises: blasting the organic liquid sludge with gas by injecting the gas into the organic liquid sludge to obtain an hydrolyzed sludge; supplying the hydrolyzed sludge to a pressurized reactor; and evacuating the hydrolyzed sludge from the pressurized reactor via a member that generates a pressure drop in the hydrolyzed sludge;
        each of the at least 6 additional cycles comprises blasting the hydrolyzed sludge, evacuated from the reactor in an immediately preceding cycle, with the gas by injecting the gas into that hydrolyzed sludge; supplying, to the pressurized reactor, the blasted hydrolyzed sludge; and evacuating, via the member that generates the pressure drop, the hydrolyzed sludge from the pressurized reactor;
        the pressurized reactor is supplied via an element of diameter d through which the liquid sludge flows, during the first cycle, and through which the hydrolyzed sludge flows, during the at least 6 additional cycles, at a first velocity v>10 m/s, at a first pressure p, and at a flow rate Q;
        the gas is injected, at a flow rate q Nm3≥10 Q m3, to create, as the blasted organic liquid sludge, or to further create, as the blasted hydrolyzed sludge, a compressible gaseous emulsion that is supplied to the reactor;
        the reactor has a diameter D>20 d and is at a second pressure P>p; and
        the compressible gaseous emulsion flows through the reactor at a second velocity V<v; and
    digesting, in a digester after performance of a last of the at least 6 additional cycles, the hydrolyzed sludge emulsion, wherein the digesting comprises: hydrolysis/acidogenesis of the hydrolyzed sludge emulsion; acetogenesis for production of acetate from the hydrolyzed sludge emulsion; and methanogenesis starting from the acetates in order to produce methane.

2. The process as claimed in claim 1, wherein the at least 6 additional cycles comprises at least 9 additional cycles.

3. The process as claimed in claim 1, wherein the at least 6 additional cycles comprises at least 14 additional cycles.

4. The process as claimed in claim 1, wherein the creating the hydrolyzed sludge emulsion is followed, before the digesting, by a TS/liquid separation on a press belt or simply by draining.

5. The process as claimed in claim 1, further comprising degassing the hydrolyzed sludge at an outlet of the reactor.

6. The process as claimed in claim 1, wherein the element of diameter d is a Venturi.

7. The process as claimed in claim 1, wherein the gas is injected in a direction of flow of the liquid sludge, during the first cycle and in a direction of the flow of the hydrolyzed sludge, during the at least 6 additional cycles, at an angle of between 20° and 90°.

8. The process as claimed in claim 1, further comprising: degassing floc, in the hydrolyzed sludge, by soft impact of the floc against itself or against an energy-absorbing flap for decelerating the floc, for recirculation to the reactor, and/or after passing through a filtration and/or settling/maturing device and the floc thus matured is recovered in order to supply the digester.

9. The process according to claim 1, wherein the at least 6 additional cycles comprises at least 19 additional cycles.

10. The process according to claim 1, wherein no sludge, from the organic liquid sludge that is blasted with the gas in the first cycle, is passed to the digester until after completion of the at least 6 additional cycles.

11. The process according to claim 1, wherein the second pressure is greater than 2 bar.

12. The process according to claim 1, wherein the second pressure is greater than 3.5 bar.

13. The process according to claim 1, wherein the second pressure is greater than 4.0 bar.

14. The process according to claim 12, wherein the second pressure is greater than or equal to 10 bars and less than 20 bars.

15. The process according to claim 1, wherein no flocculant is added as part of the creating the hydrolyzed sludge emulsion.

16. A soup or emulsion of organic sludge obtained by a process that comprises:
    creating an hydrolyzed sludge emulsion by performing a first cycle followed by at least 6 additional cycles, wherein:
        the first cycle comprises: blasting an organic liquid sludge with gas by injecting the gas into the organic liquid sludge to obtain an hydrolyzed sludge; supplying the hydrolyzed sludge to a pressurized reactor; and evacuating the hydrolyzed sludge from the pressurized reactor via a member that generates a pressure drop in the hydrolyzed sludge;
        each of the at least 6 additional cycles comprises blasting the hydrolyzed sludge, evacuated from the reactor in an immediately preceding cycle, with the gas by injecting the gas into that hydrolyzed sludge; supplying, to the pressurized reactor, the blasted hydrolyzed sludge; and evacuating, via the member that generates the pressure drop, the hydrolyzed sludge from the pressurized reactor;
        the pressurized reactor is supplied via an element of diameter d through which the liquid sludge flows, during the first cycle, and through which the hydrolyzed sludge flows, during the at least 6 additional cycles, at a first velocity v>10 m/s, at a first pressure p, and at a flow rate Q;
        the gas is injected, at a flow rate q Nm3≥10 Q m3, to create, as the blasted organic liquid sludge, or to further create, as the blasted hydrolyzed sludge, a compressible gaseous emulsion that is supplied to the reactor;
        the reactor has a diameter D>20 d and is at a second pressure P>p; and
        the compressible gaseous emulsion flows through the reactor at a second velocity V<v.

17. The soup or emulsion as claimed in claim 16, comprising at least 80% of lysed bacteria.

18. The soup or emulsion according to claim 16, wherein no flocculant is added as part of the creating the hydrolyzed sludge emulsion.

* * * * *